United States Patent
Lin et al.

(10) Patent No.: US 11,322,318 B2
(45) Date of Patent: May 3, 2022

(54) SWITCHING APPARATUS

(71) Applicant: ABB Schweiz AG, Baden (CH)

(72) Inventors: Zeming Lin, Xiamen (CN); Aki Suutarinen, Helsinki (FI); Anu-Riikka Vuorinen, Helsinki (FI); Rainer Kolmonen, Helsinki (FI); Jianshu Lai, Xiamen (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/820,141

(22) Filed: Mar. 16, 2020

(65) Prior Publication Data
US 2020/0279700 A1 Sep. 3, 2020

Related U.S. Application Data

(63) Continuation of application No. PCT/CN2018/105827, filed on Sep. 14, 2018.

(30) Foreign Application Priority Data

Sep. 15, 2017 (CN) .......................... 201710833670.5

(51) Int. Cl.
*H01H 9/26* (2006.01)
*H02J 9/06* (2006.01)
(Continued)

(52) U.S. Cl.
CPC ................ *H01H 9/26* (2013.01); *H01H 9/16* (2013.01); *H01H 9/24* (2013.01); *H02J 9/068* (2020.01); *H01H 2009/265* (2013.01)

(58) Field of Classification Search
CPC .. H01H 9/26; H01H 9/16; H01H 9/24; H01H 2009/265; H01H 9/00; H01H 9/0027;
(Continued)

(56) References Cited

U.S. PATENT DOCUMENTS 5,686,709 A * 11/1997 Casagrande ....... H01H 71/1009
200/50.32
6,084,489 A * 7/2000 Castonguay ........... H01H 1/205
218/22
(Continued)

FOREIGN PATENT DOCUMENTS

CN 100413005 C 8/2008
CN 203179728 U 9/2013
(Continued)

OTHER PUBLICATIONS

State Intellectual Property Office of the P.R. China, International Search Report & Written Opinion issued in corresponding Application No. PCT/CN2018/105827, dated Nov. 23, 2018, 9 pp.
(Continued)

*Primary Examiner* — Lheiren Mae A Caroc
(74) *Attorney, Agent, or Firm* — Greenberg Traurig, LLP (57) ABSTRACT

Implementations of the subject matter described herein provide a switching apparatus. The switching apparatus includes: a switching component including a first main shaft, which is adapted to selectively connect and disconnect at least one circuit in response to the rotation of the first main shaft; and an operating mechanism including a second main shaft for actuating the first main shaft to rotate via the second main shaft; wherein the switching component further includes a first interface, and the operating mechanism further includes a second interface, and the second main shaft to be detachably coupled to the first main shaft in response to the engagement of the first interface and the second interface.

17 Claims, 10 Drawing Sheets

(51) Int. Cl.
*H01H 9/16* (2006.01)
*H01H 9/24* (2006.01)

(58) Field of Classification Search
CPC .......... H01H 9/22; H01H 9/223; H01H 9/226; H02J 9/068; H02J 9/06
USPC ......... 200/50.01, 50.32–50.35, 50.37, 50.39, 200/50.4; 335/10, 113, 157, 158, 167, 335/168
See application file for complete search history.

(56) References Cited

U.S. PATENT DOCUMENTS

| | | | |
|---|---|---|---|
| 7,741,572 B2 * | 6/2010 | Mattlar | H01H 9/0066 200/50.32 |
| 7,863,530 B2 * | 1/2011 | Mattlar | H01H 71/1027 200/50.32 |
| 10,629,390 B2 * | 4/2020 | Kuhn | H01H 3/40 |

FOREIGN PATENT DOCUMENTS

| | | | |
|---|---|---|---|
| CN | 105336519 A | 2/2016 | |
| CN | 102810417 B | 7/2017 | |
| CN | 107068447 A | 8/2017 | |
| DE | 202009001387 U1 | 6/2009 | |
| JP | H06203690 A | 7/1994 | |

OTHER PUBLICATIONS

European Extended Search Report issued for EP Application No. 18856378.7 dated May 7, 2021.

* cited by examiner

SWITCHING APPARATUS

CROSS REFERENCE TO RELATED APPLICATIONS

This application is a continuation of PCT/CN2018/105827, filed on Sep. 14, 2018 which claims the priority of a Chinese invention patent application No. 20170833670.5, filed on Sep. 15, 2017.

BACKGROUND

Switching apparatus being widely used in industrial and home applications is well-known. Electrical automatic transfer switch is a kind of switching apparatus, which is commonly used in power distribution system for detecting and monitoring the power quality and transferring supply between main power supply and standby power supply. The automatic transfer switch typically includes an operating mechanism, an indicator and a plurality of poles. Generally, the plurality of poles are coupled to the main power supply and the standby power supply, and the operating mechanism is used to selectively connect and disconnect one of the power supplies to the load circuit, which is indicated by the indicator. Furthermore, the type of the automatic transfer switch at least includes two-position automatic transfer switch and three-position automatic transfer switch.

Typically, an integrated main shaft extends from the operating mechanism to the poles through the indicator. As a result, the conventional operating mechanism of the automatic transfer switch cannot be disassembled alone, not to mention disassembly in the case of holding the switching state of the plurality of poles with the normal power supply or standby power supply.

SUMMARY

Implementations of the subject matter described herein provide a solution for providing an operating mechanism being detached from a switching component without change the switching state of the switching component.

In the present disclosure, a switching apparatus is provided. The switching apparatus includes a switching component comprising a first main shaft and adapted to selectively connect or disconnect at least one circuit in response to a rotation of the first main shaft; and an operating mechanism comprising a second main shaft for actuating the rotation of the first main shaft; wherein the switching component further includes a first interface, the operating mechanism further includes a second interface, and the second main shaft can be detachably coupled to the first main shaft in response to an engagement of the first interface and the second interface.

Different from the conventional apparatus, the switching apparatus having the above-described structure allows the operating mechanism can be detached from the switch module individually while keeping the switching state of the switching component unchanged. This makes the switching apparatus more easy to be maintained, and thus reduces the maintenance cost. Furthermore, the above-described structure results in the maintenance may be performed without switching off the power supplies, which does not affect people's daily lives.

In some implementations, a locking member is arranged inside the first interface for locking the first main shaft in a rotation position corresponding to a switching state of the switching component.

In some implementations, the first main shaft includes at least one locking slot arranged on its circumference, and the locking member includes a locking pin operable to be inserted into one of the at least one locking slot to limit the rotation of the first main shaft.

With the above arrangement of the first main shaft and the locking member, the first main shaft may be locked in a certain position during the maintenance. This ensures that the operating mechanism may be detached from the switching component without changing the switching state of the switching component.

In some implementations, the locking member includes an operating member and operable to move from a release position to a locking position, in the release position, the locking pin is located outside one of the at least one locking slot, and in the locking position, the locking pin is located inside one of the at least one locking slot.

In some implementations, an elastic element is coupled to the locking member for driving the locking member to move from the locking position to the release position in response to a release of the operating member.

In some implementations, the switching apparatus further includes fastening lugs arranged on the first interface and having a through-hole; receiving slots arranged on the second interface for receiving the fastening lugs; and at least one fastening stud adapted to be inserted in the through-hole on the fastening lugs and screwed into the switching component from an operating hole on the switching component.

With the above structure, the operating mechanism may be coupled to the switching component in a compact and safe way.

In some implementations, a slider is arranged inside the first interface and coupled to the locking member, the slider can be driven by the locking member to cover or open the operating hole.

In some implementations, a first direction of movement of the locking member is perpendicular to a second direction of the slider, and an oblique slot is arranged on one of the slider and the locking member, the oblique slot being oblique relative to both the first and second directions, and a guiding pin is arranged on the other one of the of the slider and the locking member, the guiding pin engaging with the oblique slot to allow the locking member to drive the slider.

With the above arrangement of the slider and the locking member, in response to the movement of the locking member from the release position to the locking position, the slider may slide from a covering position to an opening position. That is, the fastening stud can be operated merely when the locking member is in the locking position. As a result, the maintenance of the switching apparatus is more secure.

In some implementations, the operating member includes a locking hole for allowing a locker to pass through to hold the locking member in the locking position.

In some implementations, the operating member includes a slot for engaging with a tool to pass through to move the locking member from the release position to the locking position.

In some implementations, the second main shaft includes a plurality of protrusions arranged on an outer circumference; and the first main shaft includes a plurality of notches arranged on an inner circumference for receiving the plurality of protrusions to transmit a rotation of the second main shaft to the first main shaft.

In some implementations, the first main shaft further includes an alignment shaft arranged parallel to and eccentrically inside the first main shaft, and the second main shaft further includes convex hulls extending radially and inwardly from inner circumference of the second main shaft; wherein an height of one of the convex hulls from the inner circumference of the second main shaft exceeds a minimum distance between the alignment shaft and the inner circumference of the second main shaft, such that the second main shaft is adapted to be inserted into the first main shaft only at a same rotation position as being detached from the first main shaft.

In some implementations, the fastening lugs include at least one upper fastening lug and at least one lower fastening lug, and the through-hole in at least one of the upper fastening lug and the lower fastening lug is a threaded hole to be engaged with a threaded section on the fastening stud.

With the above arrangement of the first and second main shafts, the mistake insertion of the second main shaft that the rotating position is not same as being detached from the first main shaft is prevented. This improves the security of the switching apparatus effectively.

In some implementations, the first interface includes a first positioning means, and the second interface includes a second positioning means coupled with the first positioning means to position the second interface relative to the first interface.

In some implementations, the first interface includes a first electrical connection interface, and the second interface includes a second electrical connection interface coupled with the first electrical connection interface to provide electrical connection between the operating mechanism and the switching component.

In some implementations, the switching component includes an indicator for indicating a switching state of the switching component, and wherein the first interface is arranged on the indicator, and the first main shaft passes through the indicator.

In some implementations, the switching apparatus is a power supply transfer switch, and the switching component is operable to selectively couple one of at least two power supplies to a load circuit.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

FIGS. 3A-3B show cross-sectional views of the indicator according to implementations of the present disclosure, where FIG. 3A shows the locking member being in the locking position and FIG. 3B shows the locking member being in the release position;

FIGS. 4A-4B show side views of the indicator according to implementations of the present disclosure, where FIG. 4A shows the locking member being in the release position and FIG. 4B shows the locking member being in the locking position;

FIGS. 7A-8B show side views of the indicator according to implementations of the present disclosure, where FIGS. 7A and 8A show the locking member being in the release position and FIGS. 7B and 8B show the locking member being in the locking position;

FIGS. 9A-9B show perspective view of the indicator according to an implementation of the present disclosure; where FIG. 9A shows the locking member being in the release position and FIG. 9B shows the locking member being in the locking position; and FIGS. 10A-10B show cross-sectional views of the switching apparatus according to an implementation of the present disclosure; where

Throughout the drawings, the same or similar reference symbols are used to indicate the same or similar elements.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

In some conventional designs, the switching apparatus includes an integrated shaft extending from the operating mechanism to the poles. This structure determines that the operating mechanism cannot be disassembled alone. Accordingly, this brings a lot of inconvenience to the maintenance. For example, if only a small problem occurs in the operating mechanism, a cutting off of the power supply is required and the entire switching apparatus should be completely removed, which also results in increased maintenance costs.

Figure 1:
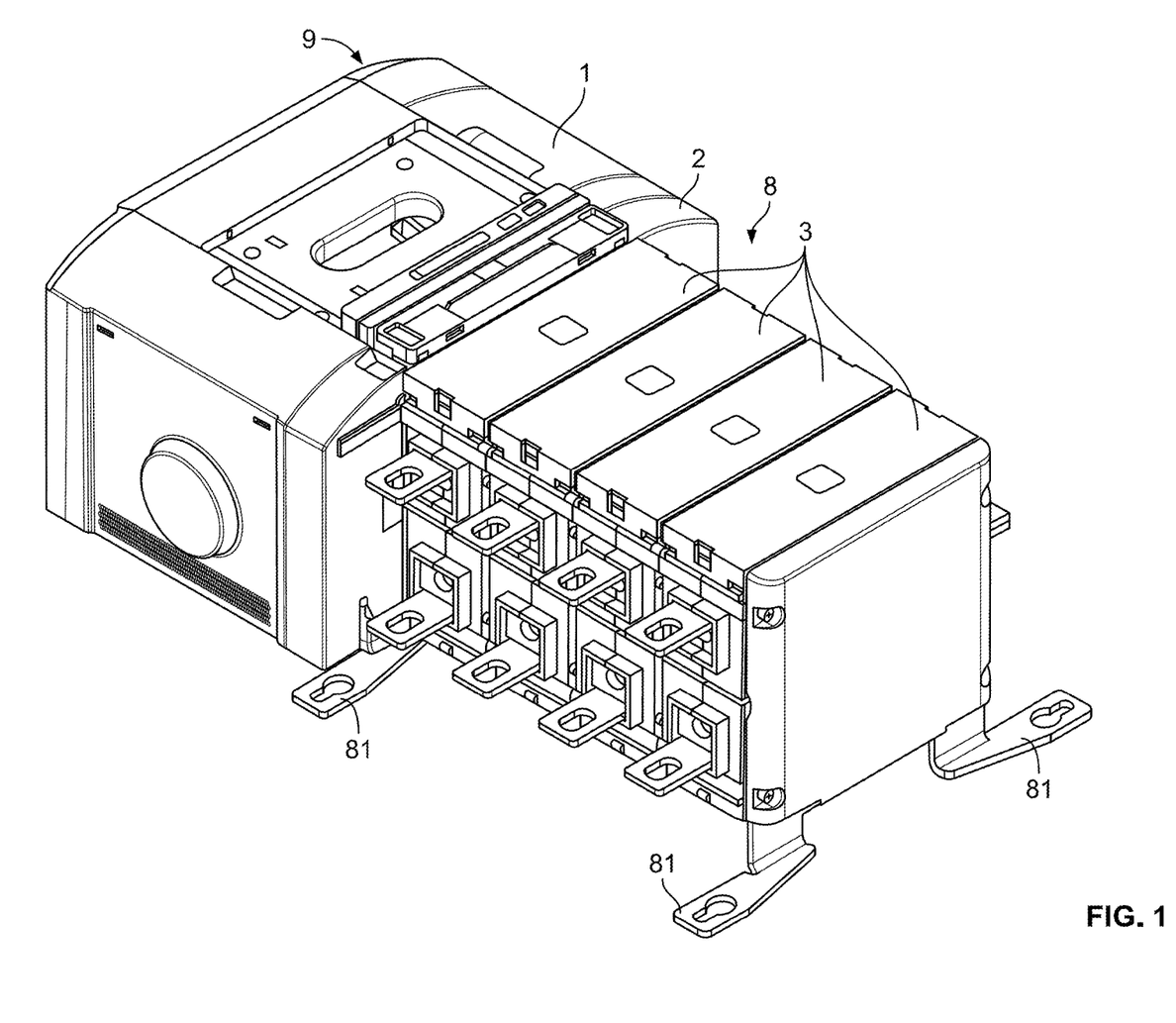
FIG. 1 is a perspective view of a switching apparatus according to implementations of the present disclosure.
Figure 2:
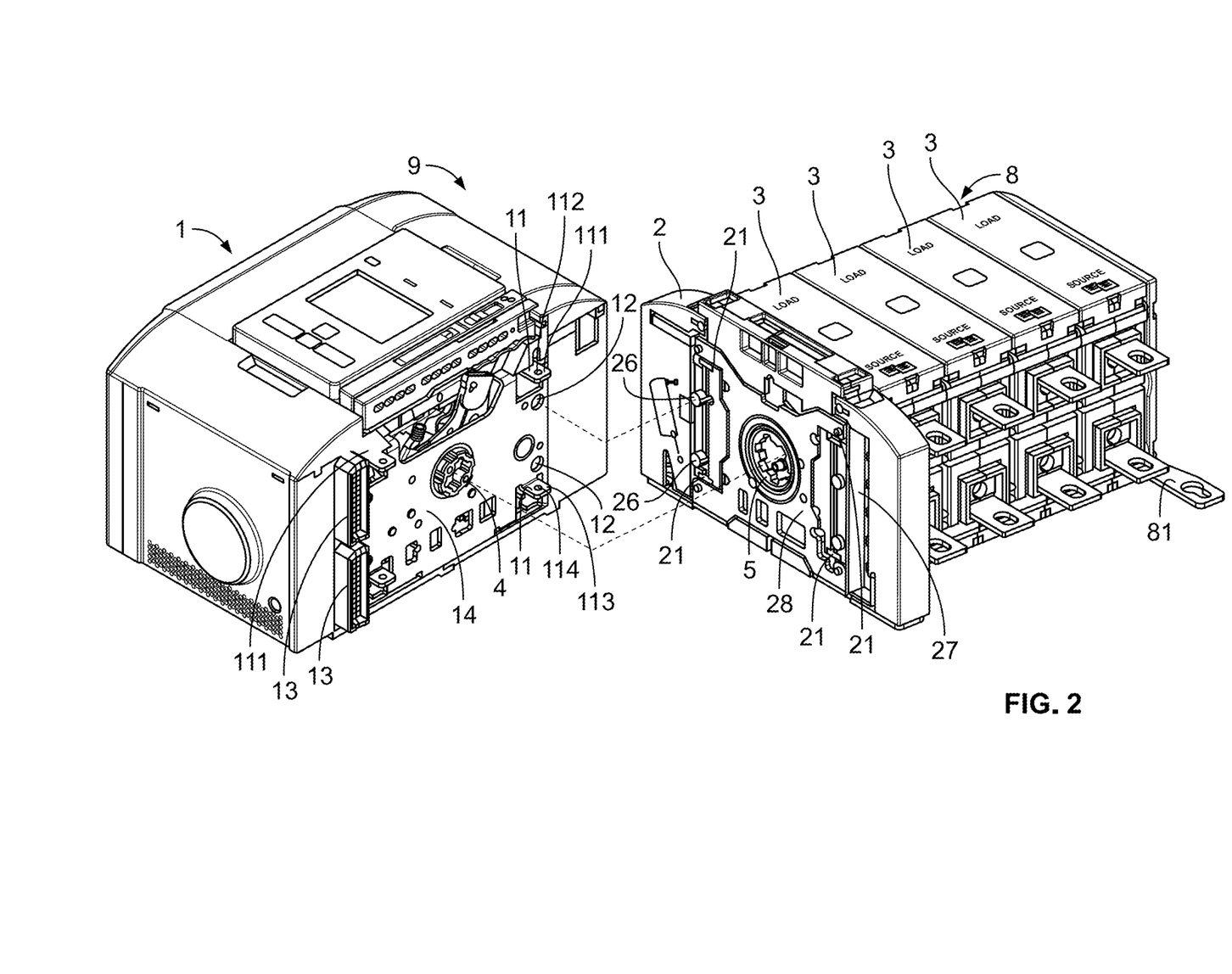
FIG. 2 is an exploded view of a switching apparatus according to implementations of the present disclosure.

FIG. 1 is a perspective view of a switching apparatus 9 according to implementations of the present disclosure and FIG. 2 is an exploded view of a switching apparatus 9 according to implementations of the present disclosure. Generally, the switching apparatus 9 according to implementations of the present disclosure includes an operating mechanism 1 and a switching component 8. The operating mechanism 1 is used to control the switching state of the switching component 8 with any one of the power supplies.

Specifically, the switching state means the connection state of the power supplies with the load circuit. For example, for the two position transfer switch, there are two switching state, one of which is the connection of the main power supplies with the load circuit and another is the connection of the standby power supplies with the load circuit. Furthermore, for the three position transfer switch, in addition to the above two switching state, there is an off state which means no power supply is connected to the load circuit and the load circuit is in a power-off state.

Different from the conventional switching apparatus, the operating mechanism 1 and the switching component 8 include a separate main shaft respectively. For ease of description, the main shaft of the switching component 8 is called the first main shaft 5 and the main shaft of the operating mechanism 1 is called the second main shaft 4. The second main shaft 4 is used to actuate the first main shaft 5 to rotate. In response to the rotation of the first main shaft 5, the switching component 8 can selectively connect and disconnect one of the power supplies to at least one circuit.

Furthermore, the switching component 8 and the operating mechanism 1 further include cooperating interfaces. For ease of description, the interface of the switching component 8 is called a first interface 28, and the interface of the operating mechanism 1 is called a second interface 14. In response to the engagement of the first and second interface 28, 14, the second main shaft 4 can be detached from the first main shaft. The engagement of the first and second interface 28, 14 includes positioning, locking, fastening and electrical connection between the first and second interfaces 28, 14.

Accordingly, the above mentioned structure of the operating mechanism 1 and the switching component 8 allows the operating mechanism 1 to be individually detachably coupled to the switching component 8 to form the switching apparatus 9. This facilitates maintenance and therefore reduces the cost of maintenance.

In some implementations, the switching component 8 may be fixed to a plate or wall via fastening brackets 81 during normal use. The fastening brackets 81 may be fixed on the housing of the switching component 8 via a bolt or the like. In some implementations, the fastening brackets 81 may be integrated with the housing of the switching component 8.

The switching component 8 may be fixed to the plate or the wall in various ways. For example, a bolt may be passed through a hole of each of fastening brackets 81 and screwed into the plate or the wall to fix the switching component 8 thereon. In some implementations, the switching component 8 may be suspended on the plate or the wall by a protrusion on the wall, such as a nail, through the hole of the fastening bracket 81.

After that, the operating mechanism 1 may be detachably coupled to the switching component 8 and thus the combination of the operating mechanism 1 and the switching component 8, i.e., the switching apparatus 9, may be fixed on the plate or the wall. In some implementations, there are at least 4 fastening brackets 81 which are respectively located at the lower corners or at any other suitable positions of the switching component 8.

In some implementations, the operating mechanism 1 itself further has fastening brackets (not shown). For example, in a case that the operating mechanism 1 is too heavy to be fixed by the fastening means between the operating mechanism 1 and the switching component 8, the operating mechanism 1 may be further fixed to the plate or the wall via its fastening brackets while being detachably coupled to the switching component 8. In some implementations, the fastening brackets of the operating mechanism 1 may be located at all the lower corners of the operating mechanism 1 or only at the lower corners away from the switching component 8.

As shown in FIG. 1, in some implementations, the switching apparatus 9 according to the present disclosure may be a power supply transfer switch and include an indicator 2 and a plurality of poles 3 adapted to selectively connect and disconnect one of at least two power supplies to a load circuit. The indicator 2 may be located on one side of the plurality of the poles 3 and can indicate the switching state. In some implementations, the first interface 28 may be provided on the indicator 2 and the first main shaft 5 may pass through the indicator 2 to another side of the plurality of poles 3.

In some implementations, the first main shaft 5 itself may use separate structures comprising separate main shafts like the first and the second main shafts. That is, there are separate main shafts in the indicator 2 and the plurality of poles 3 or between any one of the plurality of poles 3. Accordingly, the indicators 2 and any one of the plurality of poles 3 can be individually maintained or replaced in the event of a fault. This further makes it easy to maintain any one part of the switching apparatus 9.

Furthermore, the above structure allows the operating mechanism 1 to be detached from the switching component 8 while keeping the switching state of the switching component 8 unchanged. That is, the operating mechanism 1 can be removed in any switching state of the switching component 8, even in the state of one of at least two power supplies and the load circuit being connected.

In order to prevent an undesired rotation of the first main shaft 5 in the case of the second shaft 4 being detached from the first main shaft 5, in some implementations, a locking member 6 may be provided in the first interface 28, as shown in FIGS. 3A to 4B. This ensures that the first main shaft 5 may keep in a rotation position corresponding to the switching sate of the switching component 8. Therefore, when the operating mechanism 1 is assembled to the switching component 8 again, the locking member 6 may ensure the rotation position of the second main shaft 4 being same as being detached from the first main shaft 5. Thus, the occurrence of misplaced assembly of the first and second shafts 5, 4 is prevented.

Figure 3A:
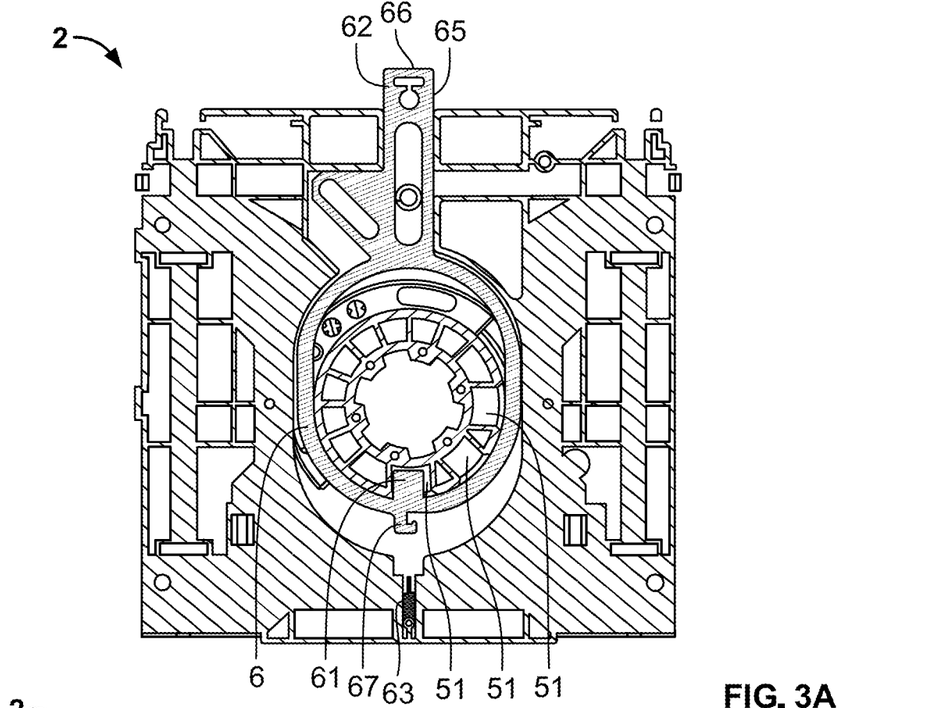
Figure 3B:
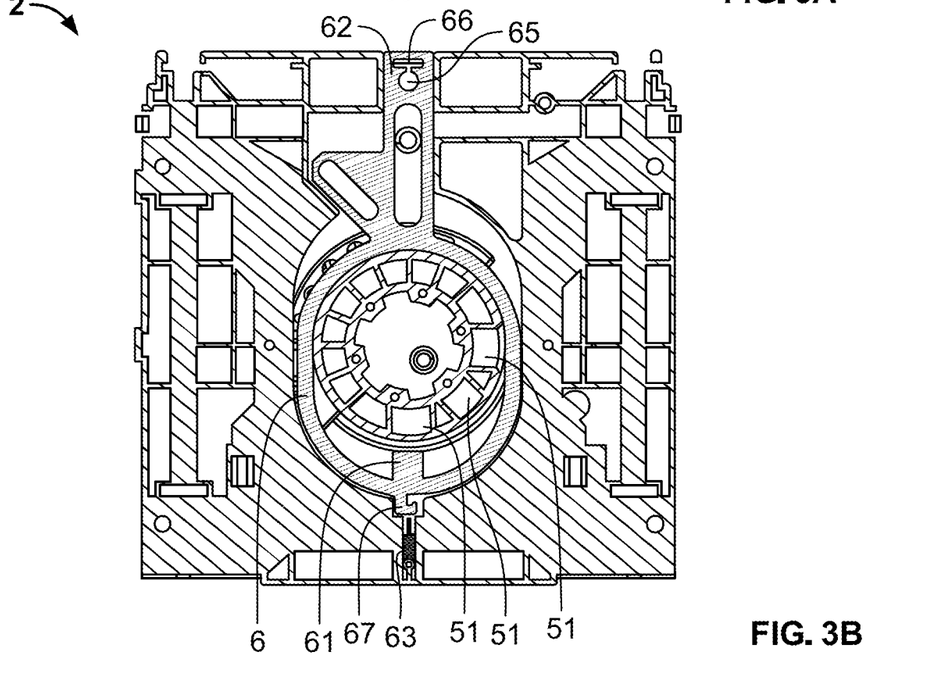

In some implementations, as shown in FIGS. 3A and 3B, at least one locking slot 51 may be provided on the circumference of the first main shaft 5. Correspondingly, the locking member 6 may include a locking pin 61 which can be inserted in one of the at least one locking slot 51 to limit the rotation of the first main shaft 5. In some implementations, the locking member 6 may be located in a cavity of the indicator 2 and can slide between two positions, which refer to a release position and a locking position for ease of description.

Figure 4A:
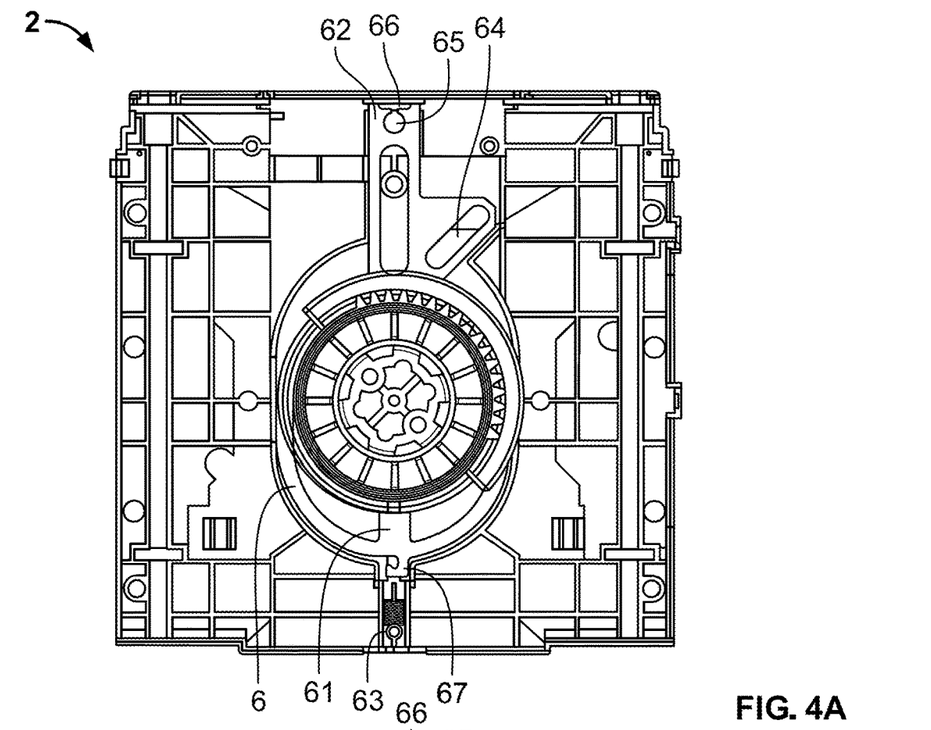
Figure 4B:
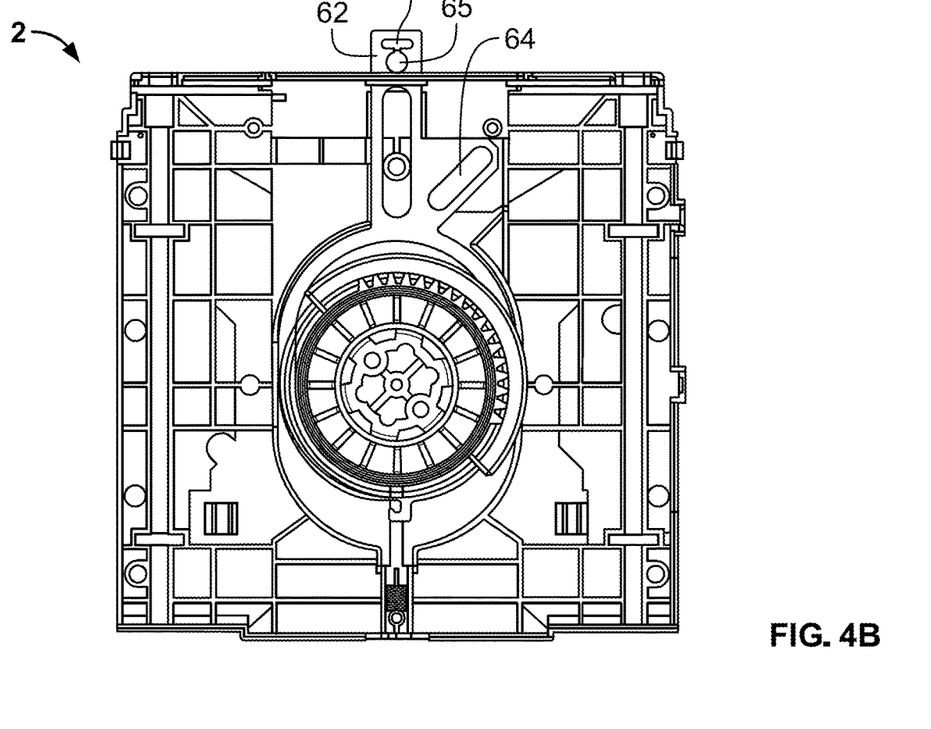

Specifically, in the release position, as shown in FIGS. 3B and 4A, the locking pin 61 is located outside one of the at least one locking slot 51. As shown in FIGS. 3A and 4B, in the locking position, the locking pin 61 is located inside one of the locking slots 51. In some implementations, the locking member 6 may include an operating member 62 having a slot 66. A tool (not shown) may be inserted into the slot 66 to drive the operating member 62 to move from the inside of the housing of the indicator 2 to the outside, such that the locking member 6 is driven to move from the release position to the locking position. Furthermore, in some implementations, the locking slot 51 and the locking pin 61 may use other forms of mutual cooperation, such as the gears, or the like.

As shown in FIG. 3A, in some implementations, a locking hole 65 is provided on the operating member 62, which is used for a locker (not shown) to pass through to hold the locking member 6 in the locking position. It should be understood that the locking member 62 may be held in the locking position in other ways, for example, by friction, snap connection, or the like.

In some implementations, the outer end of the operating member 62 is substantially flush with the outer surface of the indicator 2 in the release position, as shown in FIG. 3B. A recess may be provided at the position of the outer surface of the indicator 2 adjacent to the operating member 62 to facilitate the insertion of the tool into the locking hole 65.

In some implementations, as shown in FIGS. 3A and 3B, an elastic element 63, such as a spring, may be provided to be connected to the locking member 6. In some implementations, an end of the elastic element 63 may be fixed on the housing of the indicator 2, and another end may be connected to a hook 67 of the locking member 6 for driving the locking member 6 to move from the locking position to the release positions in response to the release of the operating member 62, i.e., the release of the engagement between the slot 66 and the tool.

Figure 5:
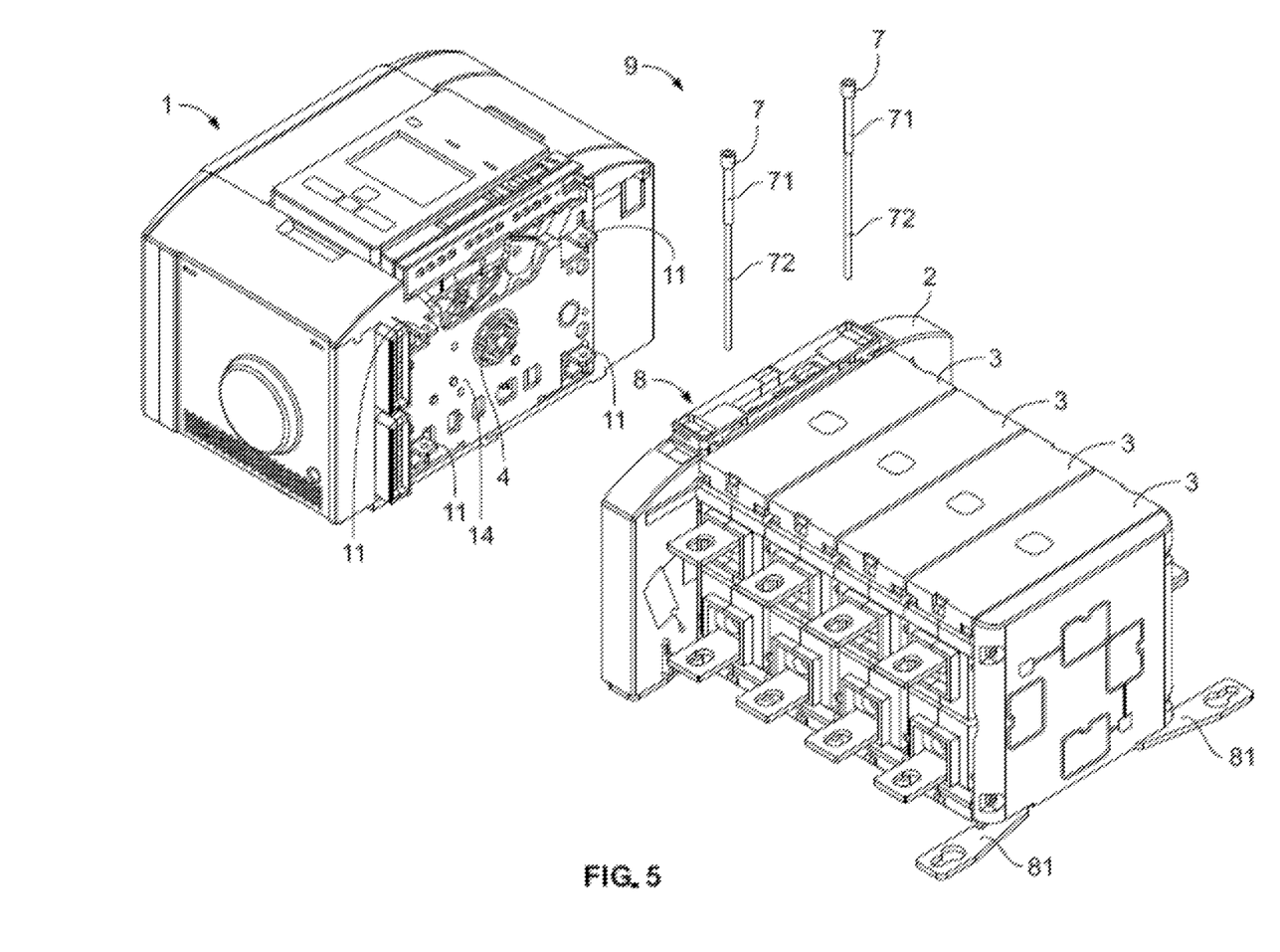
FIG. 5 is an exploded view of a switching apparatus according to implementations of the present disclosure, where the fastening studs are removed from the indicator.
Figure 6:
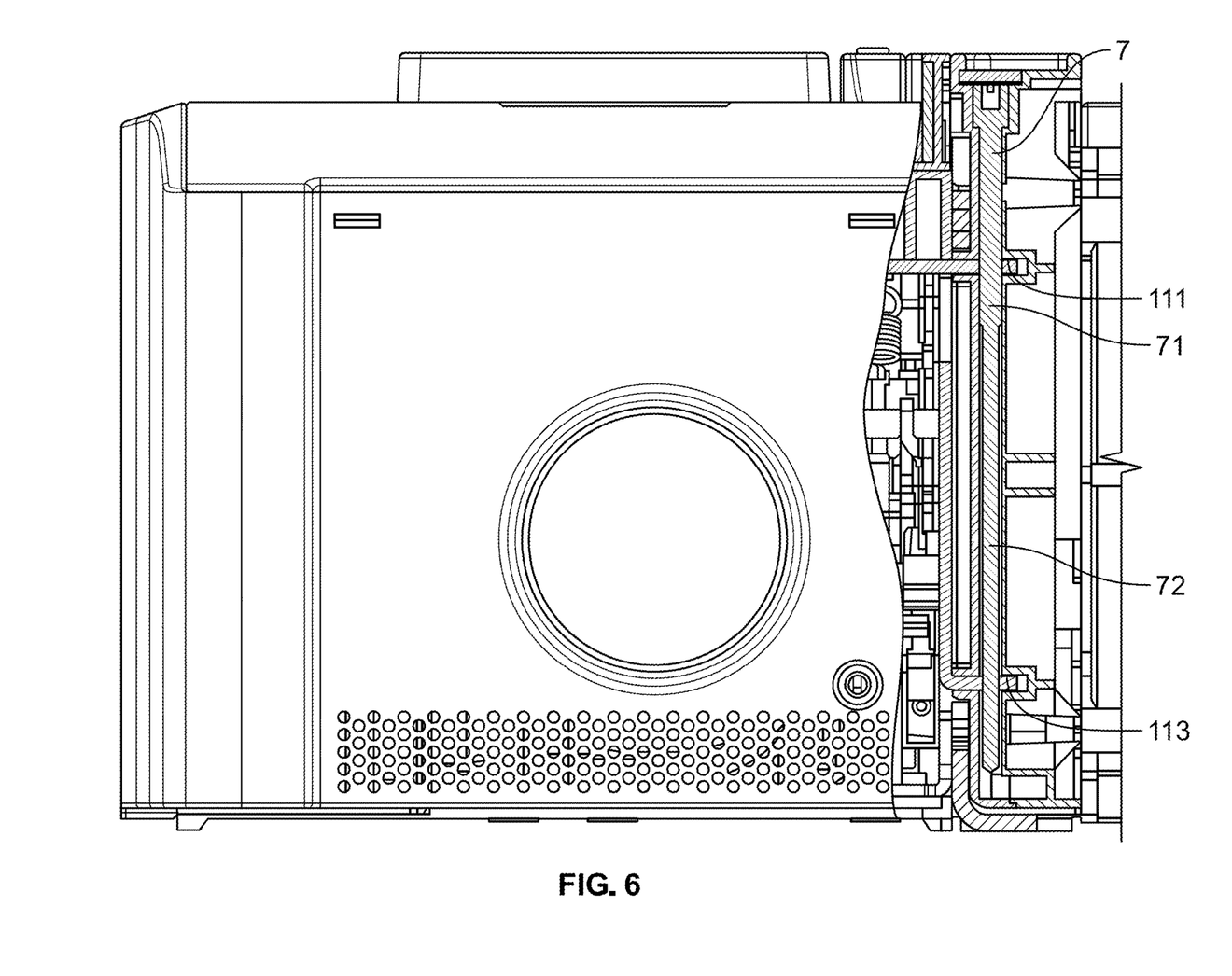
FIG. 6 shows partially cross-sectional views of the switching apparatus according to an implementation of the present disclosure.

FIG. 5 is an exploded view of a switching apparatus 9 according to implementations of the present disclosure; and FIG. 6 shows partially cross-sectional views of the switching apparatus 9 according to an implementation of the present disclosure. As shown in FIGS. 2, 5 and 6, in some implementations, at least a fastening stud 7 is provided to fix the operating mechanism 1 to the switching component 8 in position. To this end, in some implementations, fastening lugs 11 each having a through-hole and corresponding receiving slots 21 for receiving the fastening lugs 11 may be arranged on the first and second interfaces 28, 14 respectively.

As shown in FIG. 6, the fastening studs 7 may be inserted into the through-hole and screwed into the switching component 8 from an operating hole 24. In this way, the operating mechanism 1 may be connected to the switching component 8 compactly. Furthermore, the fastening studs 7 may be screwed in or out only from the operating hole 24 only when the first main shaft 5 is locked, which will be discussed in detail below. Thus, the operating mechanism 1 may be connected to the switching component 8 in a more safe way.

In some implementations, the fastening lugs 11 may include at least an upper fastening lug 111 and at least a lower fastening lug 113. The through-hole in the upper fastening lug 111 or in the lower fastening lug 113 may be a threaded hole 112 which may be engaged with a threaded section on the fastening stud 7. In some implementations, the through-holes in the upper and lower fastening lugs 111, 113 may both be threaded holes.

In order to prevent the fastening studs 7 from being erroneously removed during the normal use of the switching apparatus 9, a slider 22 which may cover the operating hole 24 is provided in the first interface 28, preferably, in the indicator 2, as shown in FIGS. 7A to 9B. In some implementations, the slider 22 may be coupled to the locking member 6. As a result, the slider 22 may be driven by the locking member 6 from a covering position in which the operating hole 24 is covered and to an opening position in which the operating hole 24 is opened.

Figure 8A:
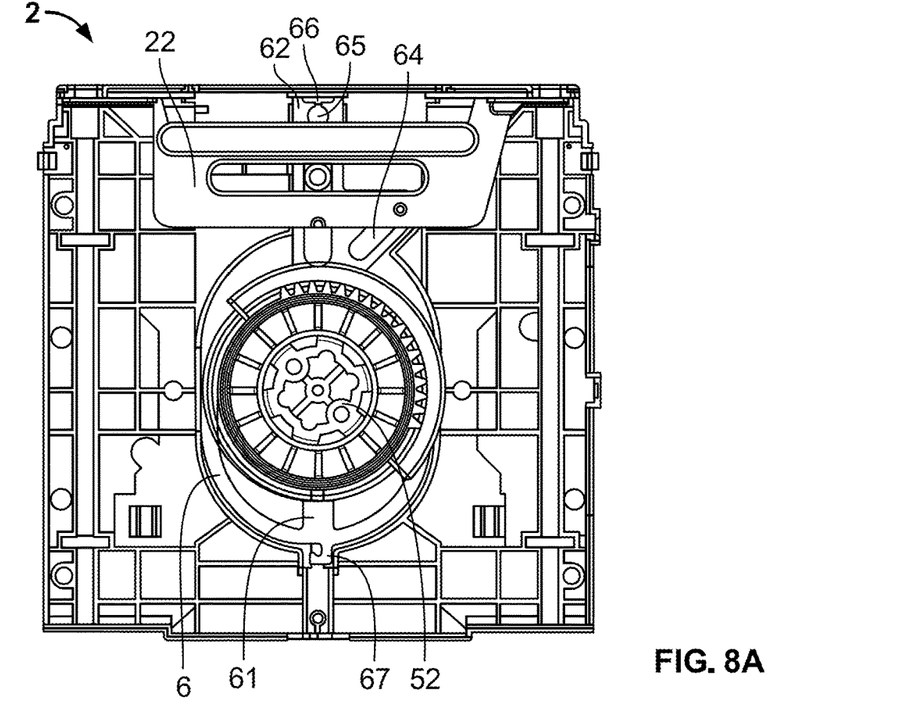
Figure 8B:
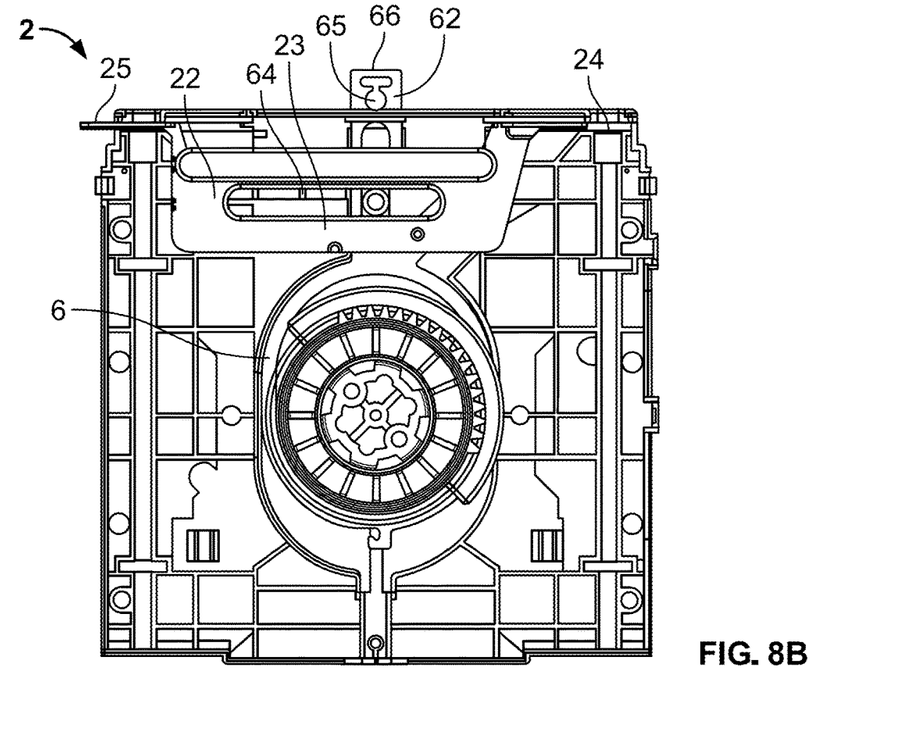

Specifically, in the case of the locking member 6 moving from the release position to the locking position, the slider 22 may be driven from the covering position to the opening position, as shown in FIG. 8B. Accordingly, the operating hole 24 is open, which allows a tool to insert in the operating hole 24 to screw the fastening stud 7 out. Thereby the operating mechanism 1 may be detached from the switching component 8. It should be understood that the operating hole 24 keeps open during the maintenance. After the maintenance, the fastening lug 11 may be inserted back into the receiving slot 21 again, and then the fastening stud 7 may be inserted into the through-hole of the fastening lug 11 from the operating hole 24.

Figure 9A:
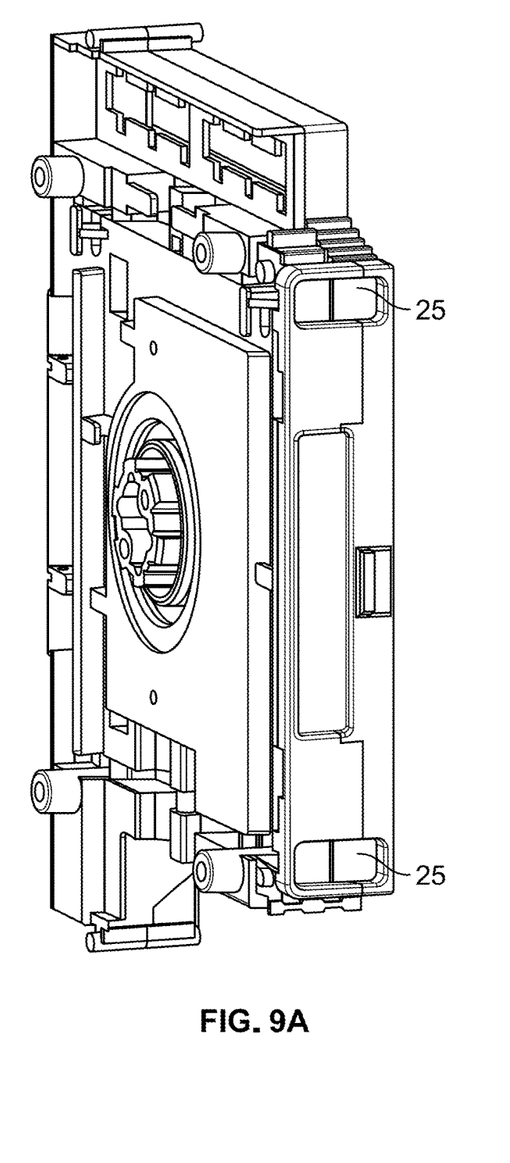
Figure 9B:
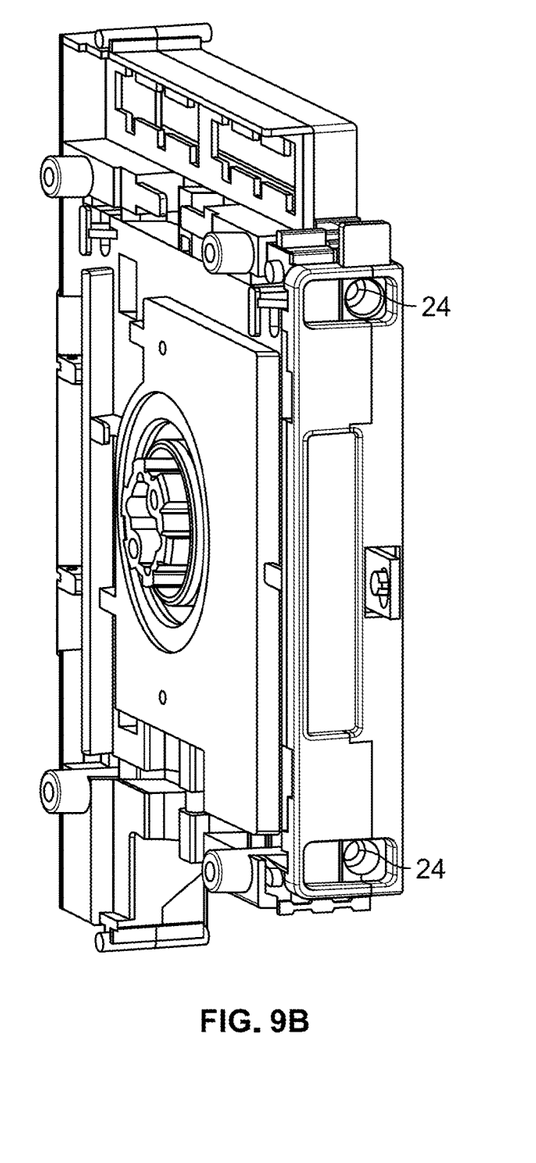

Before the fastening stud 7 being screwed into the switching component 8, at least a part of the fastening stud 7 protrudes from the switching component 8. As a result, the slider 22 cannot move from the opening position back to the covering position even the locker is not used in the locking hole 65. This is because the slider 22 is obstructed by the at least part of the fastening stud 7. After the fastening stud 7 being screwed into the switching component 8 completely and in the case of the tool being released from the slot 66 and the locker being removed from the locking hole 65, the slider 22 may be driven by the locking member 6 from the opening position to the covering position, as shown in FIG. 9A.

Figure 7A:
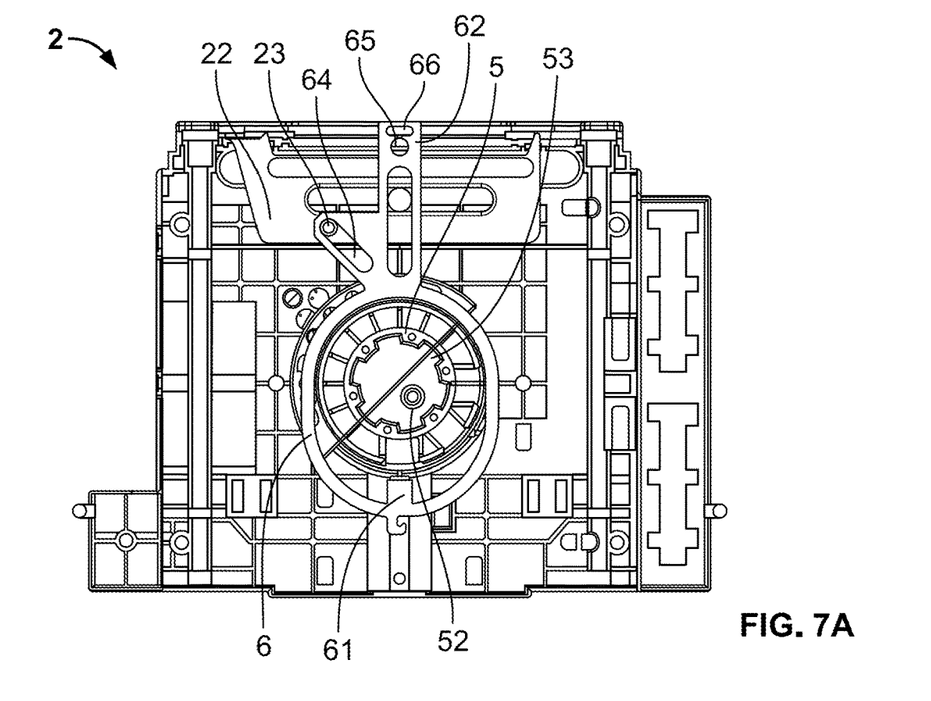
Figure 7B:
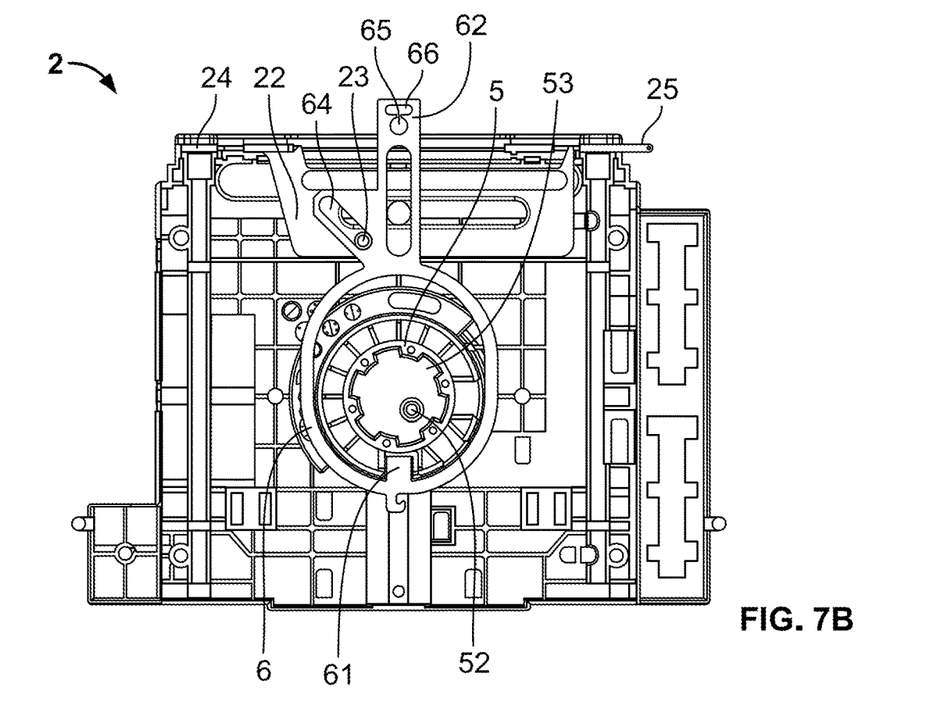

In some implementations, the slider 22 may be driven by the locking member 6 by the following means. Specifically, as shown in FIGS. 7A and 7B, an oblique slot 64 may be provided on the locking member 6 and a guiding pin 23 which may be inserted in the oblique slot 64 is arranged on the slider 22. As a result, the movement of the locking member 6 may drive the slider 22 to slide via the guiding pin 23. In some implementations, the moving direction of the locking member 6 between the locking position and the release position, which is referred to as the first direction for ease of description, is perpendicular to the sliding direction of the slider 22 between the opening position and the covering position, which is referred to as the second direction for ease of description. Correspondingly, the oblique slot 64 may be oblique relative to the first and second directions.

It should be understood that the position of the oblique slot 64 and the guiding pin 23 may be interchanged. That is, the oblique slot 64 may be provided on the slider 22 and the guiding pin 23 may be arranged on the locking member 6 alternatively. Furthermore, in some implementations, the oblique slot 64 and the guiding pin 23 may use other forms of mutual cooperation, such as the link mechanism, or the like.

It can be seen from the above that in some implementations, the locking member 6 may be preferably used both as a locking means to lock the first main shaft 5 in position and as a driving means to drive the slider 22. It should be understood that in some implementations, the locking member 6 may be used as any one of the locking means and the driving means. For example, the locking member 6 may be used as locking means to lock the first main shaft 5, whereas the slider 22 may be driven by other means, and vice versa.

Figure 10A:
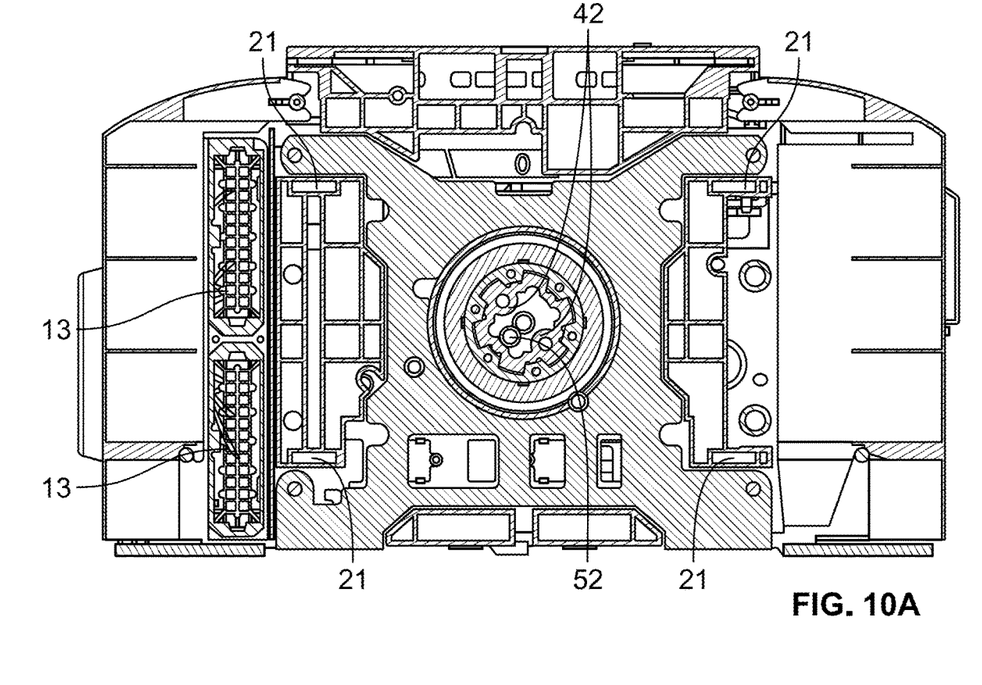
Figure 10B:
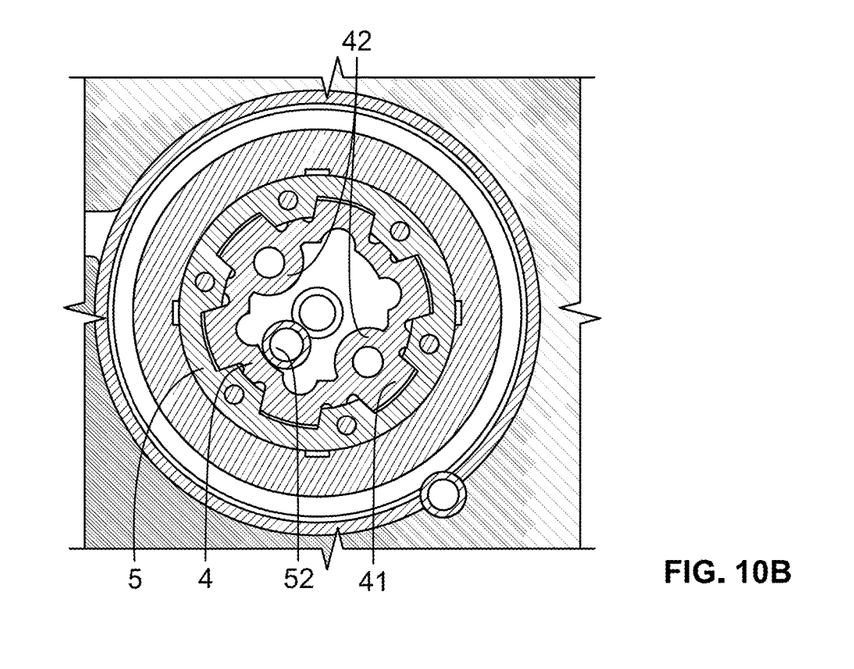
FIG. 10B is a partially enlarged view of the first and second main shafts showing in FIG. 10A.

After the operating mechanism 1 is fitted on the switching component 8, there are many ways in which the first and second main shafts couple with each other. In some implementations, as shown in FIGS. 10A and 10B, a plurality of protrusions 41 may be provided on the outer circumference of the second main shaft 4. Correspondingly, a plurality of notches 53 may be arranged on the inner circumference of the first main shaft 5. As a result, each of the plurality of protrusions 41 may be inserted into one of the plurality of the notches 53 to transmit the rotation of the second main shaft 4 to the first main shaft 5. It should be understood that the protrusions 41 and notches 53 may be distributed on the circumference evenly or unevenly.

It should be understood that the above implementations are the exemplary implementations, and other appropriate means may be used to transmit the rotation of the second main shaft 4. For example, the key and groove fit, the gears, or the like can be used alternatively.

In some implementations, in order to prevent mistake insertion that the second main shaft 4 is not inserted into the first main shaft at the same rotation position as being detached from the first main shaft 5, a mis-displaced structure may be used. Preferably, as shown in FIG. 10B, an alignment shaft 52 may be provide eccentrically inside the first main shaft 5 and parallel to the first main shaft 5. Correspondingly, two convex hulls 42 may extend radially and inwardly from the inner circumference of the second main shaft 4 and face to each other.

The height of each of the two convex hulls 42 from the inner circumference of the second main shaft 4 may be larger than the minimum distance between the alignment shaft 52 and the inner circumference of the second main shaft 4. In some implementations, the convex hull 42 may have a substantially semicircular cross section, and its span in the inner circumferential direction is preferably no less than 45 degree. It should be understood that the convex hull 42 may have other shape, such as the wedge shape, or the like. Furthermore, the convex hull 42 and the alignment shaft 52 may be hollow or solid.

In this situation, it is assumed that the positions of the first and second main shafts 5, 4 as shown in FIG. 10A are in a state of the load circuit being connected to the main power supply, and the operating mechanism 1 is detached from the switching component 8 in this state. If the accidental rotation of the second main shaft 4 occurs during the maintenance, for example, the second main shaft 4 rotates accidentally from the position corresponding to the main power supply to another position corresponding to the standby power supply or to the off position, the two convex hull 42 rotates to the position interfering with the alignment shaft correspondingly.

As a result, the second main shaft 4 cannot be inserted back into the first main shaft 5 due to the interference and the second main shaft 4 only be inserted into the first main shaft 5 at the same rotation position as being detached from the first main shaft 5. Accordingly, the mistake insertion may be prevented.

Referring back to FIGS. 2 and 5, in some implementations, position means are provided on the first and second interfaces 28, 14 to ensure the positioning of the first and second interfaces 28, 14. Preferably, a first positioning means 26 may be arranged on the first interface 28 and a corresponding second positioning means 12 may be arranged on the second interface 14. Accordingly, the first positioning means 26 may be coupled with the second positioning means 12 to position the second interface 14 relative to the first interface 28. In some implementations, the first positioning means 26 may be a protrusion protruding from the first interface 28 and the second positioning means 12 is a hole to receive the protrusion, as shown in FIGS. 2 and 5. It should be understood that the protrusion and the hole may be interchanged.

In some implementations, there are electrical connection interfaces provided on the first and second interfaces 28, 14 to electrically connect the operating mechanism 1 with the switching component 8. Preferably, a first electrical connection interface 27, such as a female connector, may be arranged on the first interface 28, and a second electrical connection interface 13, such as a male connecter which may be inserted into the female connector, may be arranged on the second interface 14. As a result, the electrical connection may be established easily. It should be understood that the male and female connecters may be interchanged.

What is claimed is:

1. A switching apparatus comprising:
   a switching component comprising a first main shaft and adapted to selectively connect or disconnect at least one circuit in response to a rotation of the first main shaft; and
   an operating mechanism comprising a second main shaft for actuating the rotation of the first main shaft;
   wherein the switching component comprises a first interface, the operating mechanism comprises a second interface, and the second main shaft can be detachably coupled to the first main shaft in response to an engagement of the first interface and the second interface, wherein the switching apparatus further comprises a locking member arranged inside the first interface for locking the first main shaft in at least two rotation positions each corresponding to a switching state of the switching component,
   wherein the first main shaft comprises at least one locking slot arranged on a circumference, and the locking member comprises a locking pin operable to be inserted into one of the at least one locking slot to limit the rotation of the first main shaft.

2. The switching apparatus of claim 1, wherein
   the locking member comprises an operating member and is operable to move from a release position to a locking position,
   in the release position, the locking pin is located outside one of the at least one locking slot, and
   in the locking position, the locking pin is located inside one of the at least one locking slot.

3. The switching apparatus of claim 2, wherein an elastic element is coupled to the locking member for driving the locking member to move from the locking position to the release position in response to a release of the operating member.

4. The switching apparatus of claim 3, wherein the operating member comprises a locking hole for allowing a locker to pass through to hold the locking member in the locking position.

5. The switching apparatus of claim 3, wherein the operating member comprises a slot for engaging with a tool to pass through to move the locking member from the release position to the locking position.

6. The switching apparatus of claim 1, further comprising:
   fastening lugs arranged on the second interface and having a through-hole;
   receiving slots arranged on the first interface for receiving the fastening lugs; and
   at least one fastening stud adapted to be inserted in the through-hole on the fastening lugs and screwed into the switching component from an operating hole on the switching component.

7. The switching apparatus of claim 6, wherein
   a slider is arranged inside the first interface and coupled to the locking member, the slider can be driven by the locking member to cover or open the operating hole.

8. The switching apparatus of claim 7, wherein
a first direction of movement of the locking member is perpendicular to a second direction of the slider, and
an oblique slot is arranged on one of the slider and the locking member, the oblique slot being oblique relative to both the first and second directions, and
a guiding pin is arranged on the other one of the slider and the locking member, the guiding pin engaging with the oblique slot to allow the locking member to drive the slider.

9. The switching apparatus of claim 6, wherein the fastening lugs include an upper fastening lug and at least one lower fastening lug, and the through-hole in at least one of the upper fastening lug and the at least one lower fastening lug is a threaded hole to be engaged with a threaded section on the at least one fastening stud.

10. The switching apparatus of claim 1, wherein the second main shaft comprises a plurality of protrusions arranged on an outer circumference; and
the first main shaft comprises a plurality of notches arranged on an inner circumference for receiving the plurality of protrusions to transmit a rotation of the second main shaft to the first main shaft.

11. The switching apparatus of claim 10, wherein the first main shaft further comprises an alignment shaft arranged parallel to and eccentrically inside the first main shaft, and
the second main shaft further comprises convex hulls extending radially and inwardly from an inner circumference of the second main shaft;
wherein a height of one of the convex hulls from the inner circumference of the second main shaft exceeds a minimum distance between the alignment shaft and the inner circumference of the second main shaft, such that the second main shaft is adapted to be inserted into the first main shaft only at a same rotation position as being detached from the first main shaft.

12. The switching apparatus of claim 1, wherein the first interface comprises a first positioning means, and
the second interface comprises a second positioning means coupled with the first positioning means to position the second interface relative to the first interface.

13. The switching apparatus of claim 1, wherein the first interface comprises a first electrical connection interface, and
the second interface comprises a second electrical connection interface coupled with the first electrical connection interface to provide electrical connection between the operating mechanism and the switching component.

14. The switching apparatus of claim 1, wherein the switching component comprises an indicator for indicating a switching state of the switching component, and wherein the first interface is arranged on the indicator, and the first main shaft passes through the indicator.

15. The switching apparatus of claim 1, wherein the switching apparatus is a power supply transfer switch, and the switching component is operable to selectively couple one of at least two power supplies to a load circuit.

16. A switching apparatus comprising:
a switching component comprising a first main shaft and adapted to selectively connect or disconnect at least one circuit in response to a rotation of the first main shaft; and
an operating mechanism comprising a second main shaft for actuating the rotation of the first main shaft,
wherein the switching component comprises a first interface, the operating mechanism comprises a second interface, and the second main shaft can be detachably coupled to the first main shaft in response to an engagement of the first interface and the second interface,
wherein the switching apparatus further comprises a locking member is arranged inside the first interface for locking the first main shaft in at least two rotation positions each corresponding to a switching state of the switching component,
wherein
the second main shaft comprises a plurality of protrusions arranged on an outer circumference; and
the first main shaft comprises a plurality of notches arranged on an inner circumference for receiving the plurality of protrusions to transmit a rotation of the second main shaft to the first main shaft.

17. The switching apparatus of claim 16, wherein the first main shaft further comprises an alignment shaft arranged parallel to and eccentrically inside the first main shaft, and
the second main shaft further comprises convex hulls extending radially and inwardly from an inner circumference of the second main shaft;
wherein a height of one of the convex hulls from the inner circumference of the second main shaft exceeds a minimum distance between the alignment shaft and the inner circumference of the second main shaft, such that the second main shaft is adapted to be inserted into the first main shaft only at a same rotation position as being detached from the first main shaft.

* * * * *